US009482783B2

(12) United States Patent
Aaker et al.

(10) Patent No.: US 9,482,783 B2
(45) Date of Patent: Nov. 1, 2016

(54) SYSTEMS AND METHODS FOR REDUCING MARINE FOULING

(71) Applicant: CGG SERVICES SA, Massy (FR)

(72) Inventors: Hans Aaker, Borgheim (NO); Declan Pritchard, Tynygongl (GB); Raphaël Macquin, Montrouge (FR)

(73) Assignee: CGG SERVICES SA, Massy (FR)

( * ) Notice: Subject to any disclaimer, the term of this patent is extended or adjusted under 35 U.S.C. 154(b) by 252 days.

(21) Appl. No.: 14/212,058

(22) Filed: Mar. 14, 2014

(65) Prior Publication Data

US 2014/0376329 A1    Dec. 25, 2014

Related U.S. Application Data

(60) Provisional application No. 61/836,811, filed on Jun. 19, 2013, provisional application No. 61/836,734, filed on Jun. 19, 2013.

(51) Int. Cl.
*G01V 1/04* (2006.01)
*G01V 13/00* (2006.01)
*G01V 1/38* (2006.01)

(52) U.S. Cl.
CPC ....... *G01V 13/00* (2013.01); *G01V 1/38* (2013.01)

(58) Field of Classification Search
CPC ................. G01V 13/00; G01V 1/38
USPC ........................... 367/15, 17
See application file for complete search history.

(56) References Cited

U.S. PATENT DOCUMENTS

| 4,244,749 A * | 1/1981 | Sachs | F28G 7/00 |
| | | | 134/1 |
| 4,375,991 A * | 3/1983 | Sachs | B08B 3/12 |
| | | | 134/1 |
| 5,299,172 A * | 3/1994 | Badger | G01V 1/186 |
| | | | 29/25.35 |
| 5,735,226 A * | 4/1998 | McNeal | B63B 59/04 |
| | | | 114/222 |
| 7,881,159 B2 * | 2/2011 | Hegna | G01V 1/201 |
| | | | 367/173 |
| 8,593,906 B2 * | 11/2013 | Traetten | G01V 1/201 |
| | | | 174/101.5 |
| 2005/0095351 A1 * | 5/2005 | Zumeris | A61L 2/02 |
| | | | 427/2.1 |
| 2006/0002234 A1 * | 1/2006 | Lobe | G01V 1/201 |
| | | | 367/153 |
| 2006/0144286 A1 * | 7/2006 | Baum | C09D 5/16 |
| | | | 106/18 |
| 2009/0314193 A1 * | 12/2009 | Groves | B63B 59/04 |
| | | | 114/222 |
| 2009/0316526 A1 * | 12/2009 | Grall | G01V 1/3826 |
| | | | 367/20 |
| 2010/0020644 A1 * | 1/2010 | Vignaux | G01V 1/201 |
| | | | 367/154 |
| 2010/0042389 A1 * | 2/2010 | Farruggia | B08B 3/12 |
| | | | 703/6 |
| 2011/0123477 A1 * | 5/2011 | Mount | A01N 33/10 |
| | | | 424/78.09 |

OTHER PUBLICATIONS

UltraSonic Antifouling Ltd., "How Ultrasonic Works to Prevent Growth", on-line article, downloaded Mar. 14, 2014.
UltraSonic Antifouling Ltd., "Sailboats", on-line article, downloaded Mar. 14, 2014.
Sercel, "Seal 428, Marine Seismic Acquisition System", brochure, Sep. 2011.
Sercel, "Seal 428, General", brochure, Jun. 2012.

* cited by examiner

*Primary Examiner* — Daniel L Murphy
(74) *Attorney, Agent, or Firm* — Patent Portfolio Builders PLLC (57) ABSTRACT

Systems and methods are provided for a marine seismic streamer usable underwater for marine seismic surveys. The marine seismic streamer includes: a lead-in section; at least one bird section; at least one data acquisition module; and at least one vibration module configured to vibrate the marine seismic streamer, wherein the lead-in section, the at least one bird section, the at least one data acquisition module and the at least one vibration module are connected together to form the marine seismic streamer.

19 Claims, 9 Drawing Sheets

SYSTEMS AND METHODS FOR REDUCING MARINE FOULING

RELATED APPLICATIONS

The present application claims priority under 35 U.S.C. §119(e) to U.S. Provisional Patent Application Ser. No. 61/836,734, filed Jun. 19, 2013, for "Antibarnacle Ultra Sound Devices & Method" and to U.S. Provisional Patent Application Ser. No. 61/836,811, filed Jun. 19, 2013, for "Method for Vibrating Seismic Cables or Devices Mounted on Seismic Cables to Reduce Fouling and Barnacle Growth", the entire contents of which are expressly incorporated herein by reference.

TECHNICAL FIELD

The embodiments relate generally to methods and systems and, more particularly, to methods and systems for reducing fouling of marine equipment.

BACKGROUND

During the past years, offshore drilling has continually increased. Given high costs and risks associated with offshore drilling, to avoid a dry well, marine seismic surveys are used to generate a profile (image) of the geophysical structure under the seafloor. While this profile does not necessarily provide an accurate location for the oil and gas, it suggests, to those trained in the field, the presence or absence of oil and/or gas.

Figure 1:
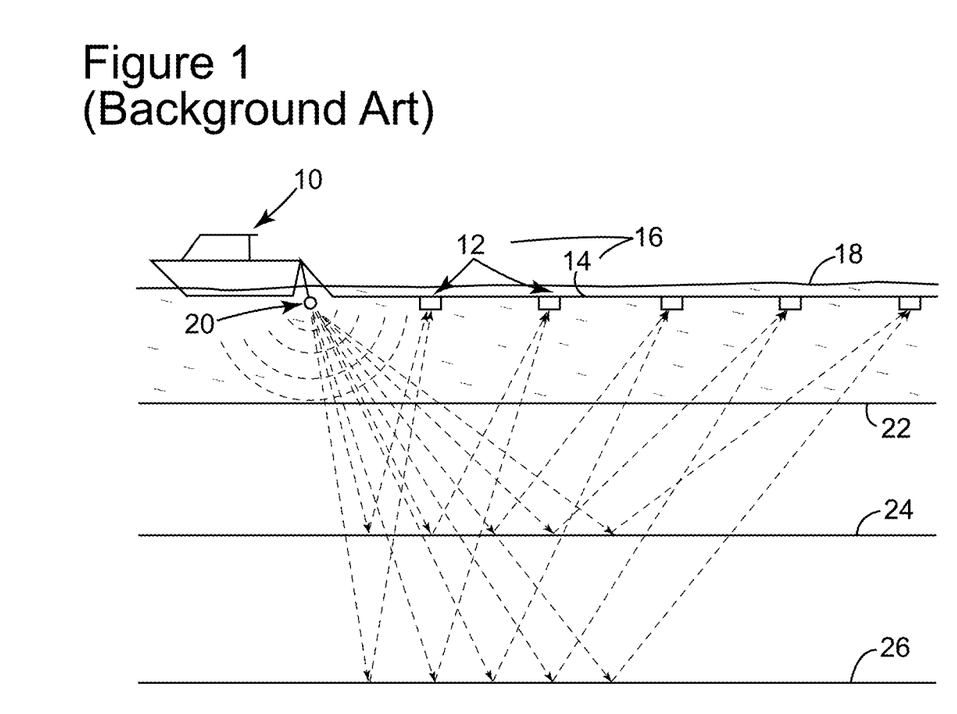
FIG. 1 is a schematic diagram of a seismic survey system.

During a seismic exploration, as illustrated in FIG. 1, a vessel 10 tows seismic detectors 12 distributed along a cable 14. Cable 14 carrying seismic detectors 12 is called a streamer 16. A streamer may be up to ten km long and may be formed from plural sections of few hundreds of meters each. Vessel 10 may tow plural streamers 16 at once. Towed streamer 12 may have a constant depth relative to the ocean surface 18 throughout its length, or have a variable depth profile.

Vessel 10 also tows a seismic source 20 configured to generate seismic waves, which penetrate the solid structure under the seafloor 22, and are at least partially reflected by interfaces 24 or 26 between layers having different seismic wave propagation speeds. Seismic detectors 12 detect the reflected waves. The time delay between firing the seismic source and detecting a related reflection provides information about the location (depth) of reflecting interfaces.

Seismic exploration campaigns may last long periods (e.g., several months). During these campaigns, the streamers preferably remain in the water (except, for example, in cases of extreme unfavorable weather conditions) because recovering/deploying the streamers is expensive and tedious. Thus, the streamers are immersed in sea water for several consecutive months, at a shallow depth (a few meters), and are generally dragged at low speed (less than or equal to five knots). In these circumstances, the streamers' outer surfaces are subject to fouling, particularly due to the proliferation of microorganisms or bio-fouling. One of the most common types of microorganisms attaching to streamers is barnacles which adhere permanently to a hard substrate either by growing their shells directly onto the substrate or by means of a stalk. Examples of areas susceptible to marine grown on a streamer include birds, collars, weights and other places where higher levels of turbulence exist.

In time, bio-fouling results in substantial disadvantages such as: (1) generating hydrodynamic flow noise; (2) amalgams or incrustations forming on the streamer's outer surfaces, which are likely to disturb seismic measurements; (3) increasing drag on the streamers and, consequently, increasing fuel consumption to tow them; (4) a strong, unpleasant stench developing within a few days when streamers covered with bio-fouling are recovered and exposed to air; (5) bio-fouling attracts larger marine life which further increase the risk of noisy measurements and/or damage to the streamers; and (6) streamer skin being pierced by certain types of bio-fouling, resulting in liquid intake inside the streamer.

Several techniques have been applied conventionally to address the bio-fouling problem. For example, currently barnacle scraping can be performed by crews on work boats which increase a safety risk for workers. For another example, a cleaning device with rotary brushes and/or blades may be temporarily or permanently attached on streamers to clean their outer surfaces. The use of cleaning devices is impeded by the presence of protruding elements (e.g., floaters, or trajectory correction devices known as birds) on the streamers. Although cleaning devices continue to be subject to research and improvement, their practical value (reliability versus cost) remains questionable.

Another conventional technique which has been used to address the bio-fouling problem involves using antifouling paints (also used on boat hulls), for example, paints including cuprous oxides. Such antifouling paints are used with caution, from an environmental standpoint, to minimize sea water pollution. The safe use of antifouling paints may also be problematic for the persons likely to be in contact with antifouling paints during the manipulation of seismic streamers. Furthermore, techniques for applying antifouling paint are hardly compatible with technical and economic constraints linked to marine seismic streamers because painting them is a long and costly operation due to their length. In addition, to allow the paint to dry (to minimize seawater pollution), the painted seismic streamers have to be stored in a manner that requires a considerable amount of space, which is not economically viable onboard a vessel. Antifouling paint is more commonly currently used only on specific portions of a marine seismic streamer, e.g., birds, as the wear is quite high on the streamer during deployment and recovery that the paint life is undesirably short.

Another technique which has been used on small boats to reduce marine fouling is to place one or more transducers on the inside hull section of the boat. An example of such a system is the Ultra Series II Ultrasonic Antifouling system from UltraSonic Antifouling LTD. The transducers in this system then emit a low powered ultrasonic frequency which is pulsed and resonated through the hull. This creates an environment of moving water molecules over the underwater profile of the hull which in turn prevents, or possibly restricts, growth of microorganisms which can create fouling. However, it is unclear how to adapt such ultrasonic techniques from boat hulls to sensitive electronic equipment, such as marine seismic streamers.

Accordingly, it would be desirable to provide devices, systems and methods addressing the fouling problem related to streamers used in marine seismic explorations, in an economically attractive manner while avoiding the aforedescribed problems and drawbacks.

SUMMARY

According to an embodiment there is a seismic acquisition system including: a lead-in section; at least one bird section; at least one data acquisition module; at least one vibration module, which includes at least one transducer, configured to emit ultrasonic waves based on received control signals, wherein the ultrasonic waves are within a frequency range which removes or retards growth of marine organisms on at least a portion of a marine seismic streamer; and a source of power configured to power the at least one vibration module, wherein the lead-in section, the at least one bird section, the at least one data acquisition module and the at least one ultrasound module are connected together to form the marine seismic streamer.

According to an embodiment there is a method for operating a marine seismic streamer including: connecting together a plurality of sections forming a marine seismic streamer; and emitting ultrasonic waves, by at least one ultrasound module.

According to an embodiment there is a seismic acquisition system including: a plurality of sections forming a marine seismic streamer; and at least one ultrasound module configured to emit ultrasonic waves.

BRIEF DESCRIPTION OF THE DRAWINGS

The accompanying drawings illustrate exemplary embodiments, wherein.

DETAILED DESCRIPTION

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will convey the scope of the inventive concept to those skilled in the art. The scope of the embodiments is therefore defined by the appended claims.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular feature, structures, or characteristics may be combined in any suitable manner in one or more embodiments.

According to embodiments, among other things, it is desirable to address the fouling problem related to streamers used in marine seismic explorations as discussed in the Background. More specifically, embodiments describe systems and methods which can use vibration techniques and ultrasound techniques to reduce marine fouling on marine seismic streamers. Prior to discussing embodiments in detail, a seismic streamer and associated parts (which can also be called modules, sections or portions) which together is also known as a seismic acquisition system will now be described.

Figure 2:
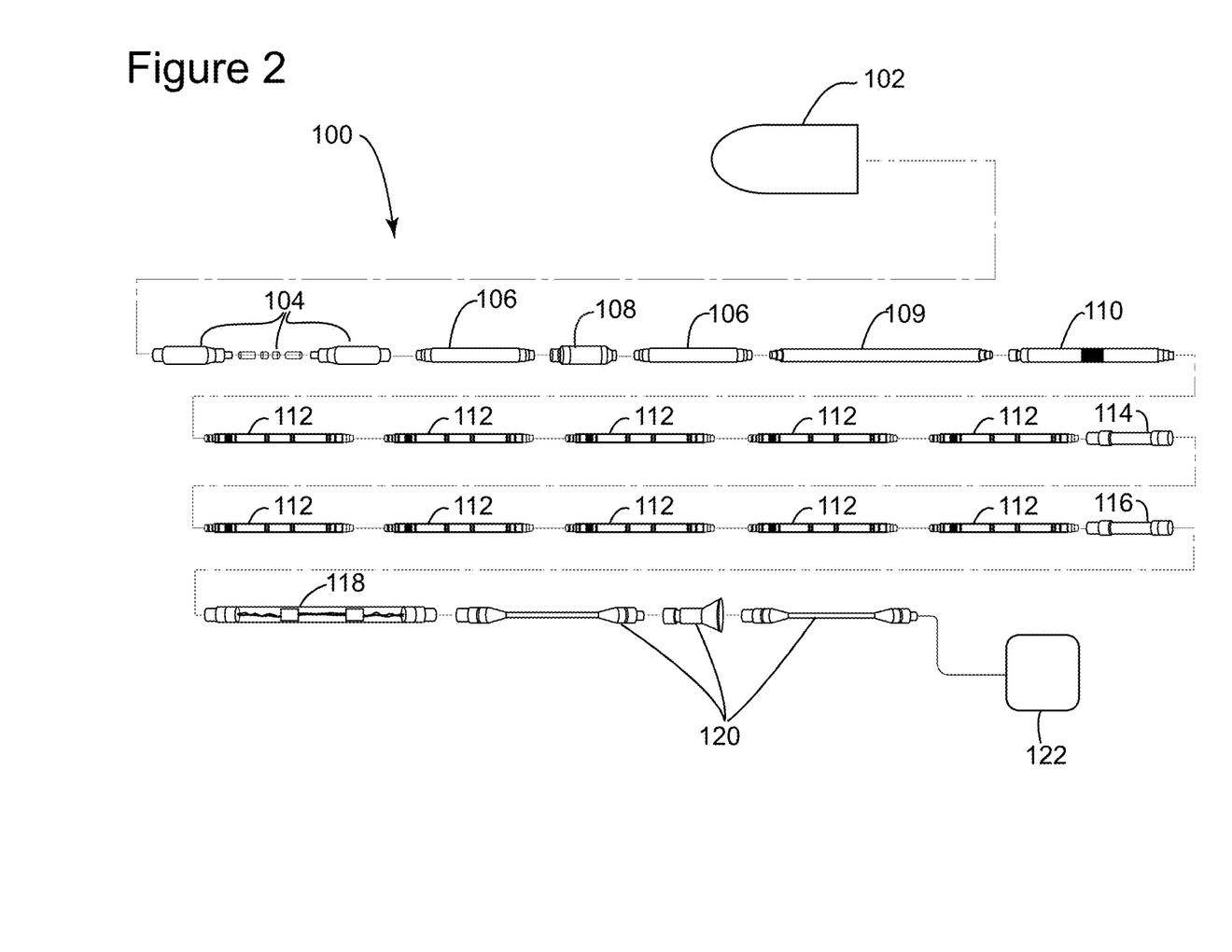
FIG. 2 depicts a marine seismic streamer according to an embodiment.

According to an embodiment illustrated in FIG. 2, various portions of a marine seismic streamer 100 which is deployed from a ship 102 are shown. The various portions of the marine seismic streamer 100 are shown as unconnected to each other for clarity, however when deployed for use in a marine embodiment the various portions of the seismic streamer 100 would be connected. In this example, the portions of the streamer 100 include a lead-in section 104, two short head sections (SHSs) 106, a head auxiliary unit (HAU) 108, a radial vibration isolation module (RVIM) 109, a head elastic section adaptor (HESA) 110, a plurality of data acquisition sections (e.g., hydrophones) 112, a line acquisition unit module (LAUM) 114, a tail acquisition and power unit (TAPU) 116, a tail elastic section (TES) 118, streamer-to-tail interface cable (STIC) 120 with a tail swivel and a tailing unit with tail buoy 122. More or fewer sections can be used as desired in seismic streamer 100, i.e., various components described above can be optional as desired. Additionally, other physical items, e.g., collars and weights (not shown), are often a part of the marine seismic streamer 100 and can also attract undesirable marine growth.

Figure 3:
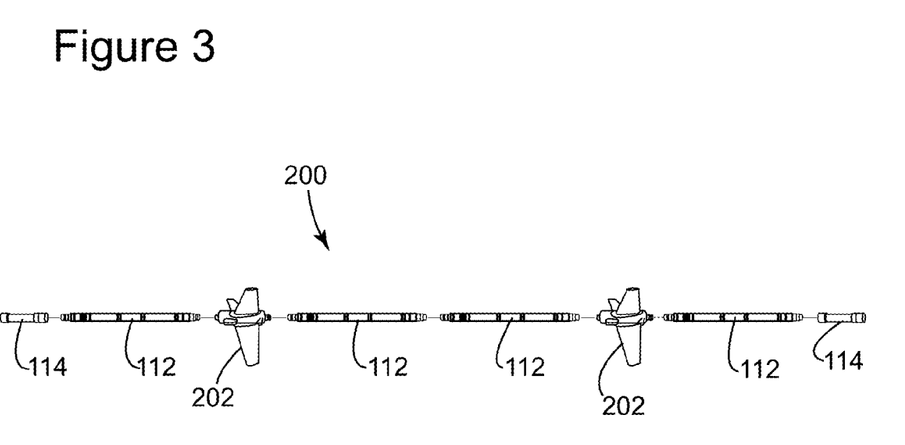
FIG. 3 illustrates a portion of another marine seismic streamer according to an embodiment.

According to another embodiment, a portion of a marine seismic streamer 200 is shown in FIG. 3. In this example, the marine seismic streamer 200 includes two LAUMs 114, a plurality of data acquisition sections 112 and two Nautilus sections 202 (also known as "birds") which are used for controlling location of the marine seismic streamer 200. As can be seen in FIGS. 2 and 3, there can be different surface geometries for some of the sections of the marine streamers 100 and 200. These different geometries assist in creating various areas of turbulence and calm on the marine seismic streamers 100 and 200 when the marine streamers 100 and 200 are towed through the water. These places of calm are often starting points for marine life, e.g., barnacles, to grow on the marine seismic streamers 100 and 200. Embodiments for reducing, removing and/or preventing growth of marine life which can be implemented on, for example, marine seismic streamers 100 and 200 will now be described.

Figure 4:
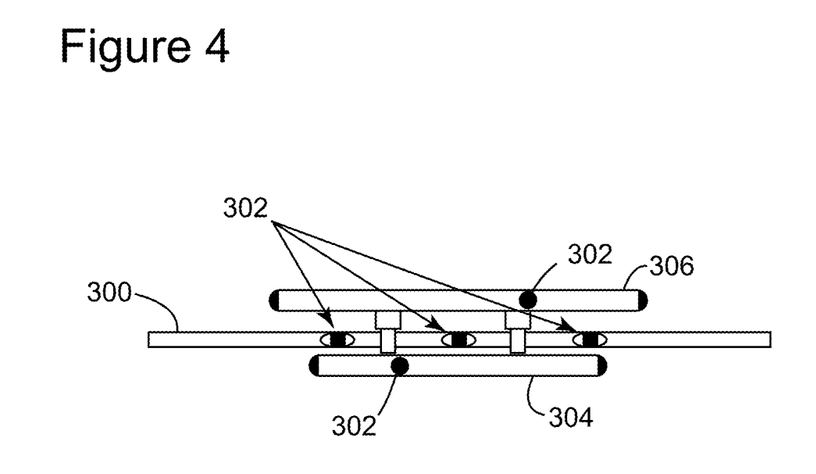
FIG. 4 shows a marine seismic streamer with ultrasound modules according to an embodiment.

According to an embodiment as illustrated in FIG. 4, one or more ultrasound modules 302, which can be or can include a transducer, can be attached to one or more portions of a marine seismic streamer 300 for emitting ultrasonic waves (and while not shown, these ultrasound modules could also be attached to the marine seismic streamers 100 and 200). These ultrasonic waves create enough water motion over the exterior of the one or more portions of the marine seismic streamer 300 to prevent and/or reduce the growth of undesirable marine growth, or be of a frequency (or frequencies/range of frequencies) to create a vibration to achieve a similar result. Alternatively, some form of vibrating module, of which the ultrasound module 302 could be one example thereof, for vibrating the marine seismic streamer 300 could be used to vibrate the marine seismic streamer 300 (or some portions thereof) to also achieve a similar result. Additionally, in some cases, the ultrasonic frequency (or frequencies/range of frequencies) can kill some forms of marine growth, e.g., barnacle cyprids, which would prevent the marine growth from gaining a foothold on the marine seismic streamer 300. These ultrasound modules 302 can alternatively or additionally be placed on specific devices, e.g., bird 306 and/or a streamer recovery device (SRD) 304, which may be attached in some fashion to the marine seismic streamer 300. These ultrasound modules 302 can be powered by battery and can include some electronics such that the ultrasound modules 302 can be turned on and off remotely from, e.g., the deploying ship.

According to another embodiment, the marine seismic streamer 300 can be manufactured and assembled to have the ultrasound modules 302, e.g., transducers, located within the exterior surface of the marine seismic streamer 300. This embodiment is expected to perform similarly to the embodiment described above with respect to FIG. 4. Additionally, these ultrasound modules 302 could be powered from already existing in-stream power, e.g., from a power cable within the marine seismic streamer 300.

Figure 5:
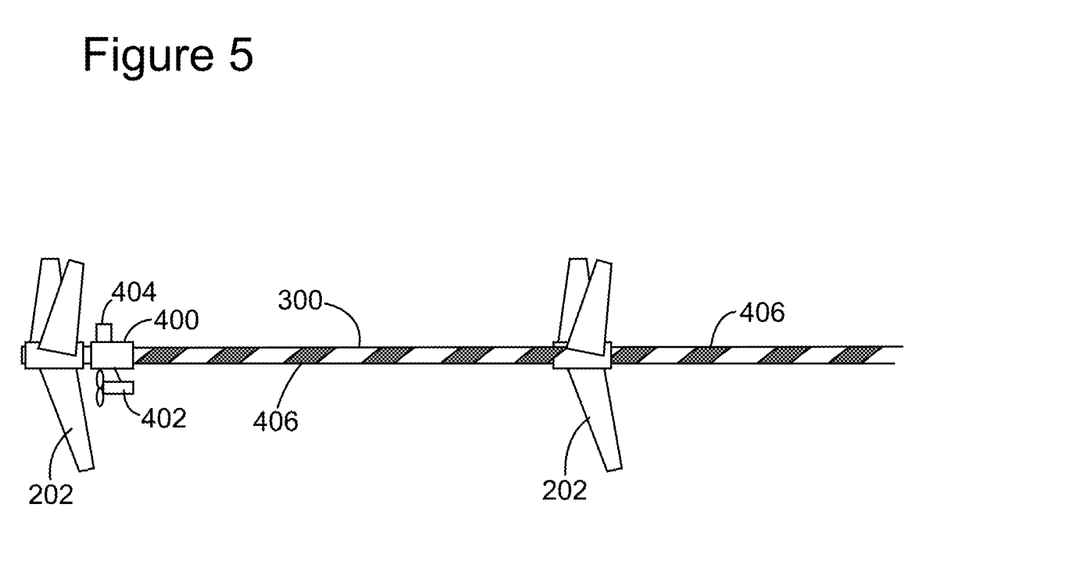
FIG. 5 depicts a marine seismic streamer with a piezoelectric material according to an embodiment.

According to another embodiment, the marine seismic streamer 300 can have a material 406, e.g., a piezoelectric material, wrapped around portions of the marine seismic streamer 300's exterior as shown in FIG. 5. This material can act as a speaker or ultrasonic conductor allowing the generated ultrasonic waves to be delivered to portions of the marine seismic streamer 300 in order to reduce a quantity of ultrasound modules which may otherwise be used. Ultrasound module 400 can be connected to the material 406. Ultrasound module 400 can be powered from a battery 404, a hydrogenerator 402 or from power obtained from a cable within the marine seismic streamer 300. Additionally, birds 202 are shown in FIG. 5 as an example of a section or piece of equipment which is part of the marine seismic streamer 300 which tends to get a lot of marine growth upon in under conventional operating circumstances. Material 406 can also be placed on other sections, e.g., birds 202, collars, etc., of the marine seismic streamer 300. One or more hydrogenerators 402 could be included as a source of power for the marine streamers 100 and 200 which can also incorporate the material 406.

According to another embodiment, the marine seismic streamer 300 can have the material 406 placed on an internal surface of the marine seismic streamer 300 for conducting the ultrasonic waves. This placing of the material 406 can be performed when the marine seismic streamer 300 is manufactured and assembled.

Figure 6:
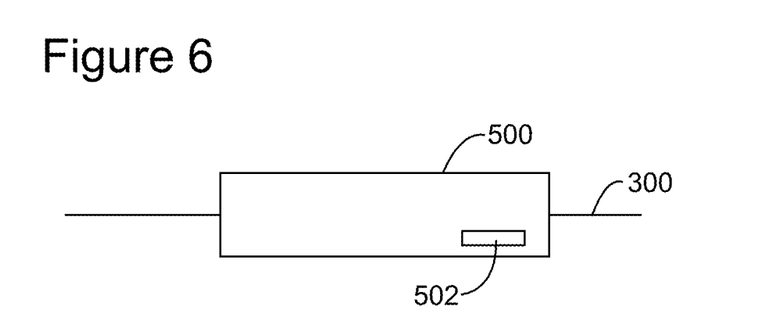
FIG. 6 shows a marine seismic streamer with a hydrophone according to an embodiment.

According to another embodiment, a hydrophone 500 as a portion of marine seismic streamer 300, as shown in FIG. 6, can be used as a source of the ultrasonic waves. In this case piezoelectric elements 502 within the hydrophone 500 can generate the ultrasonic waves. The ultrasonic waves can be generated by reversing the power through the hydrophone 500. These ultrasonic waves may conduct via the material 406 shown in FIG. 5 and/or along the marine seismic streamer 300 to reduce, remove or prevent the growth of marine organisms on portions of the marine seismic streamer 300 and the associated attached components.

According to embodiments, as described above, ultrasound techniques (or other vibration techniques from a vibration module) can be used to prevent or reduce the growth of marine life on the marine seismic streamer 300. These embodiments can generally be used at different operating times of the marine seismic streamer 300. For example, when the marine seismic streamer 300 is deployed but not actively acquiring data, ultrasonic waves can be generated as described above. The various methods and systems described above can all be turned off and on remotely from the ship from which the marine seismic streamer is deployed. Example of some times when the ultrasonic waves may be turned on include during line changes, i.e., when the vessel towing the streamers is turning around outside the survey area, and when the vessel is not engaged in marine seismic data acquisition.

According to an embodiment, the various components shown in seismic marine streamers 100, 200 and 300 can be interchanged as desired. This includes, but is not limited to, the various ultrasound or vibratory source 302 as well as the various options described herein as potential power sources, e.g., batteries, hydrogenerators 406 and internal power cables in the seismic marine streamers 100, 200 and 300.

According to another embodiment, ultrasonic waves can also be generated as described above when performing acquisition of marine seismic data. In this case, a frequency or frequencies of the ultrasonic waves can be used which does not interfere with the controls of the marine seismic streamer 300, e.g., positioning controls associated with the so-called "pingers", as well as the gathering of seismic data, e.g., the receipt of sound waves at a hydrophone. Alternatively, an interfering frequency could be used and then filtered out of the received hydrophone data. An example of a frequency of the generated ultrasonic waves is around 23 KHz, however other frequencies and/or ranges of frequencies can be used.

Figure 7:
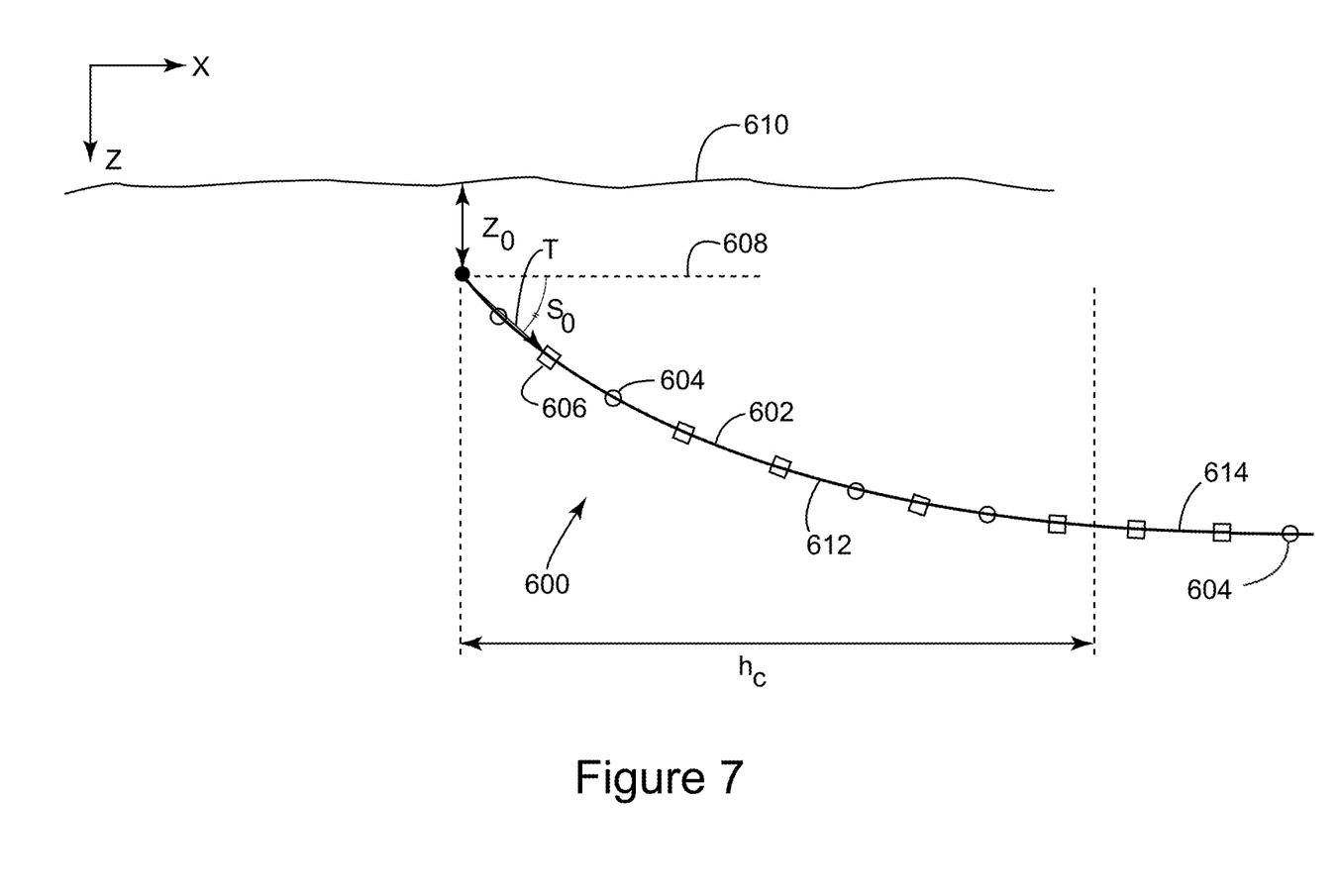
FIG. 7 shows streamers with a curved profile according to an embodiment.

According to an embodiment, streamers may be horizontal or slanted or having a curved profile as illustrated in FIG. 7. The curved streamer 600 of FIG. 7 includes a body 602 having a predetermined length; plural detectors 604 provided along the body 602; and plural birds 606 provided along the body for maintaining the selected curved profile. The streamer 600 is configured to flow underwater when towed such that the plural detectors 604 are distributed along the curved profile. The curved profile may be described by a parameterized curve, e.g., a curve described by (i) a depth $z_0$ of a first detector (measured from the water surface 610), (ii) a slope $s_0$ of a first portion T of the body with an axis 608 parallel with the water surface 610, and (iii) a predetermined horizontal distance $h_c$ between the first detector and an end of the curved profile. It is noted that not the entire streamer has to have the curved profile. In other words, the curved profile should not be construed to always apply to the entire length of the streamer. While this situation is possible, the curved profile may be applied only to a portion 612 of the streamer 600. In other words, the streamer 600 may have (i) only a portion 612 having the curved profile or (ii) a portion 612 having the curved profile and a portion 614 having a flat profile, the two portions being attached to each other.

Figure 8:
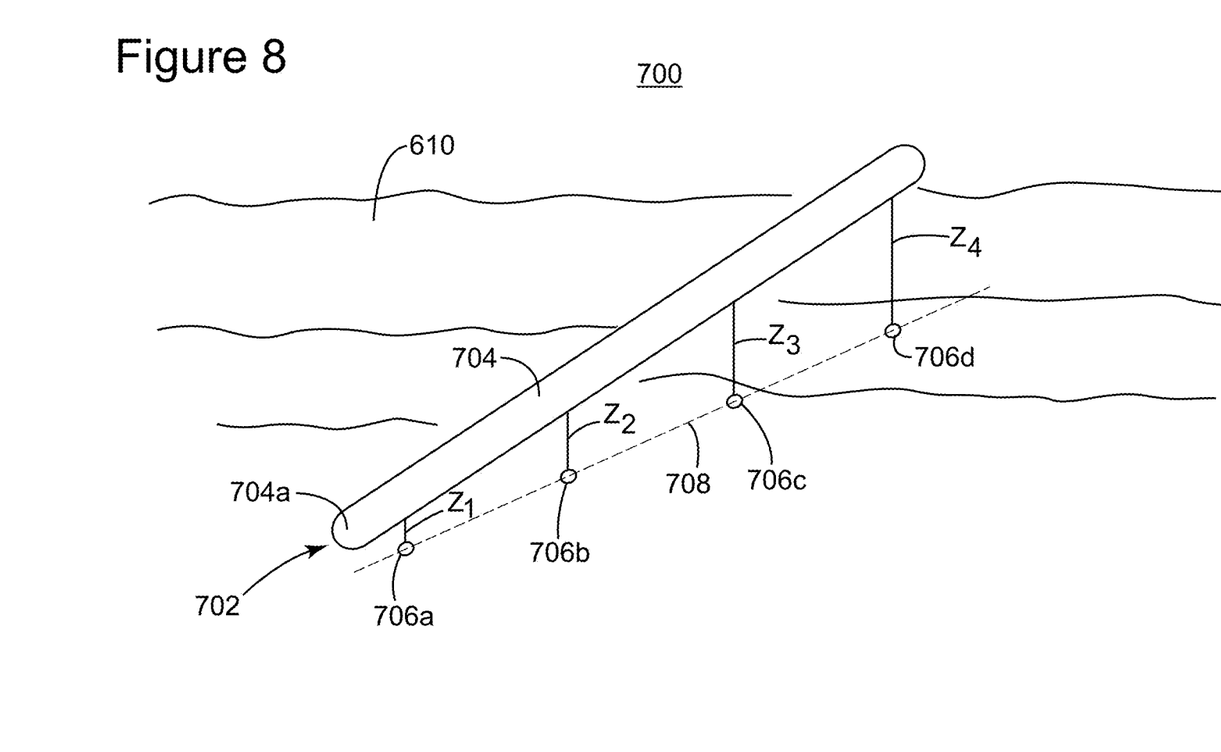
FIG. 8 illustrates a multi-level source according to an embodiment.

According to another embodiment, a multi-level source 700 which can have one or more sub-arrays can be used as is shown in FIG. 8. The first sub-array 702 has a float 704 that is configured to float at the water surface 610 or underwater at a predetermined depth. Plural source points 706a-d are suspended from the float 706 in a known manner. A first source point 706a may be suspended closest to the head 704a of the float 704, at a first depth z1. A second source point 706b may be suspended next, at a second depth z2, different from z1. A third source point 706c may be suspended next at a third depth z3, different from z1 and z3, and so on. FIG. 8 shows, for simplicity, only four source points 706a-d, but an actual implementation may have any desired number of source points. In one application, because the source points are distributed at different depths, the source points at the different depths are not simultaneously activated. In other words, the source array is synchronized, i.e., a deeper source point is activated later in time (e.g., 2 ms for 3 m depth difference when the speed of sound in water is 1500 m/s) such that corresponding sound signals produced by the plural source points coalesce, and thus, the overall sound signal produced by the source array appears as being a single sound signal.

The depths $z1$ to $z4$ of the source points of the first sub-array 702 may obey various relationships. In one application, the depths of the source points increase from the head toward the tail of the float, i.e., $z1<z2<z3<z4$. In another application, the depths of the source points decrease from the head to the tail of the float. In another application, the source points are slanted, i.e., provided on an imaginary line 708. In still another application, the line 708 is a straight line. In yet another application, the line 708 is a curved line, e.g., part of a parabola, circle, hyperbola, etc. In one application, the depth of the first source point for the sub-array 702 is about 5 m and the largest depth of the last source point is about 8 m. In a variation of this embodiment, the depth range is between 8.5 m and 10.5 m or between 11 m and 14 m. In another variation of this embodiment, when the line 708 is straight, the depths of the source points increase by 0.5 m from a source point to an adjacent source point. Those skilled in the art would recognize that these ranges are exemplary and these numbers may vary from survey to survey. A common feature of all these embodiments is that the source points have variable depths so that a single sub-array exhibits multiple-level source points.

Figure 9:
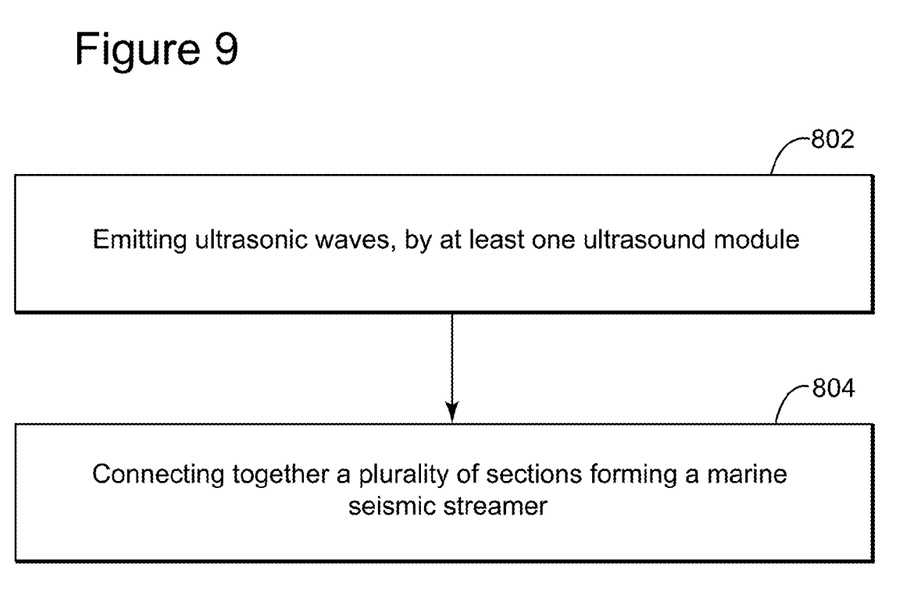
FIG. 9 shows a flowchart of a method according to an embodiment.

Utilizing the above-described exemplary systems according to exemplary embodiments, a method for operating a marine seismic streamer is shown in the flowchart of FIG. 9. The method includes: at step 802, emitting ultrasonic waves, by at least one ultrasound module; and at step 804, connecting together a plurality of sections forming a marine seismic streamer. According to an embodiment, a lead-in section, at least one bird section, at least one data acquisition module and the at least one ultrasound module (or some combination thereof) can be the plurality of sections which form the marine seismic streamer. According to an embodiment, the ultrasonic waves are generated within a frequency range which can kill or restrict growth of marine organisms on a marine seismic streamer. Alternatively, instead of the ultrasound module there can be a vibration module for vibrating the marine seismic streamer to produce a similar effect to that of the ultrasound module. Additionally, the ultrasound module is an example of a vibration module.

The method described with respect to FIG. 9 can further include other steps and description. For example, there can be a step of supplying power, by a power source, to the at least one ultrasound module, wherein the power source is at least one of a hydrogenerator or a battery. Alternatively, there can be a step of delivering the power, from a power source, via a cable inside the marine seismic streamer. Additionally, the ultrasound module can include a transducer which generates the ultrasonic waves.

The method described with respect to FIG. 9 can further include the step of locating the transducer on an exterior surface of the marine seismic streamer or locating the transducer inside an exterior surface of the marine seismic streamer. The transducer can be a piezoelectric transducer. The method can also include disposing a material on at least one portion of an exterior surface of the marine seismic streamer, wherein the material is configured to conduct the ultrasonic waves from the ultrasound module. According to an embodiment, the ultrasonic waves are at approximately 23 KHz. Furthermore, the method can include the step of toggling on and off the ultrasonic waves. And finally for the method shown in FIG. 9, the ultrasound module can be a hydrophone in which power has been reversed.

The disclosed embodiments provide an apparatus and a method for removing or reducing marine growth on marine seismic streamers. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims. No element, act, or instruction used in the description of the present application should be construed as critical or essential to the invention unless explicitly described as such. Also, as used herein, the article "a" is intended to include one or more items.

What is claimed is:

1. A marine seismic streamer comprising:
   at least one bird section;
   at least one data acquisition module;
   at least one vibration module, which includes at least one transducer, configured to emit ultrasonic waves based on received control signals, wherein the ultrasonic waves are within a frequency range which removes or retards growth of marine organisms on at least a portion of the marine seismic streamer; and
   a source of power configured to power the at least one vibration module,
   wherein the at least one bird section, the at least one data acquisition module and the at least one ultrasound module are connected together to form the marine seismic streamer, and
   wherein the vibration module is a hydrophone in which power has been reversed.

2. The marine seismic streamer of claim 1, further comprising:
   bird or streamer recovery device and the at least one vibration module is located on the bird or streamer recovery device.

3. The marine seismic streamer of claim 1, wherein the source of power is at least one of a hydrogenerator or a battery.

4. The marine seismic streamer of claim 1, wherein the source of power is a cable inside the marine seismic streamer.

5. The marine seismic streamer of claim 1, wherein the vibration module includes a piezoelectric element.

6. The marine seismic streamer of claim 5, wherein the piezoelectric element generates the ultrasonic waves at the frequency range around 23 KHz.

7. The marine seismic streamer of claim 1, further comprising:
a material disposed on at least one portion of an exterior surface of the marine seismic streamer, wherein the material is configured to conduct ultrasonic waves from the vibration module.

8. A method for operating a marine seismic streamer comprising:
connecting together a plurality of sections forming the marine seismic streamer; and
emitting ultrasonic waves, by at least one vibration module,
wherein the vibration module is a hydrophone in which power has been reversed, and
wherein the marine seismic streamer includes at least one bird section, at least one data acquisition module, the vibration module, and a source of power configured to power the vibration module.

9. The method of claim 8, further comprising: generating, by the vibration module which includes a transducer, the ultrasonic waves which reduce, prevent or remove marine growth from the marine seismic streamer.

10. The method of claim 9, wherein the transducer is located on an exterior surface of the marine seismic streamer.

11. The method of claim 9, wherein the transducer is located inside an exterior surface of the marine seismic streamer.

12. The method of claim 9, wherein the transducer is a piezoelectric transducer.

13. The method of claim 8, further comprising:
disposing a material on at least one portion of an exterior surface of the marine seismic streamer, wherein the material is configured to conduct the ultrasonic waves from the vibration module.

14. A seismic acquisition system comprising:
a plurality of sections forming a marine seismic streamer;
at least one ultrasound module configured to emit ultrasonic waves; and
a material disposed on exterior portions of the marine seismic streamer,
wherein the material is connected to the ultrasound module and acts as an ultrasonic conductor for the ultrasonic waves generated by the ultrasound module.

15. The seismic acquisition system of claim 14, wherein the ultrasound module includes a transducer which generates the ultrasonic waves which reduce, prevent or remove marine growth from the marine seismic streamer.

16. The seismic acquisition system of claim 15, wherein the transducer is located on an exterior surface of the marine seismic streamer.

17. The seismic acquisition system of claim 15, wherein the transducer is located inside an exterior surface of the marine seismic streamer.

18. The seismic acquisition system of claim 15, wherein the transducer is a piezoelectric transducer.

19. The seismic acquisition system of claim 14, wherein the material is wrapped around the exterior portions of the marine seismic streamer.

* * * * *